Oct. 5, 1948.  J. E. WATKINS  2,450,772
MEASURING APPARATUS RESPONSIVE
TO VARIABLE CONDITIONS
Filed Feb. 14, 1945  2 Sheets-Sheet 1

Inventor
John E. Watkins
BY
Carlsen, Pitzner, Hubbard & Wolf
Attorneys.

Oct. 5, 1948.  J. E. WATKINS  2,450,772
MEASURING APPARATUS RESPONSIVE
TO VARIABLE CONDITIONS
Filed Feb. 14, 1945  2 Sheets-Sheet 2
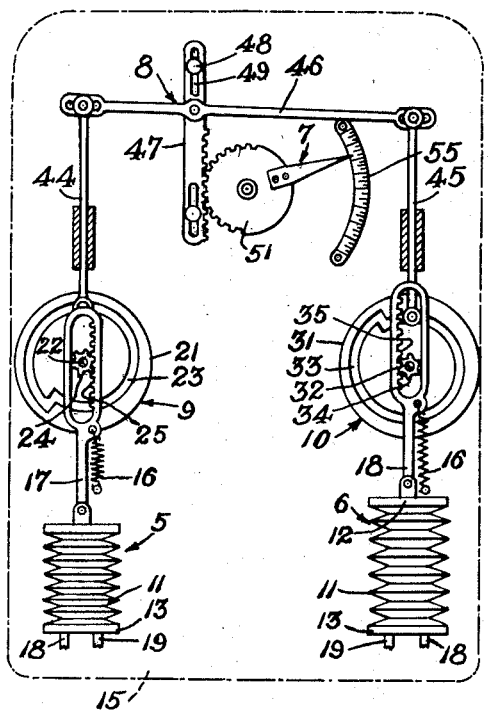
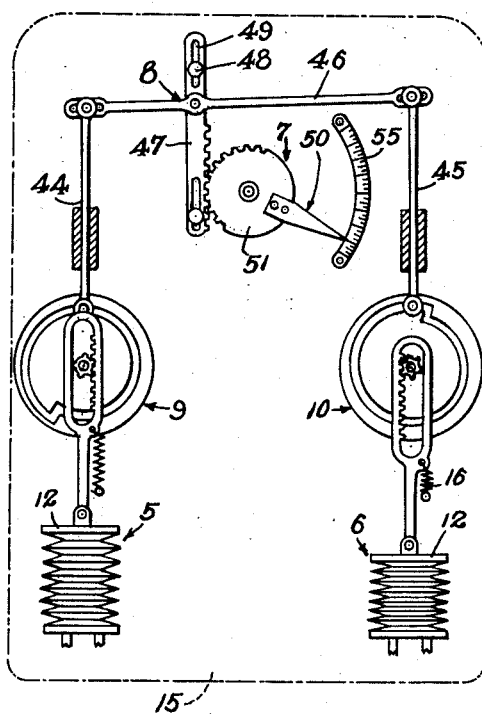
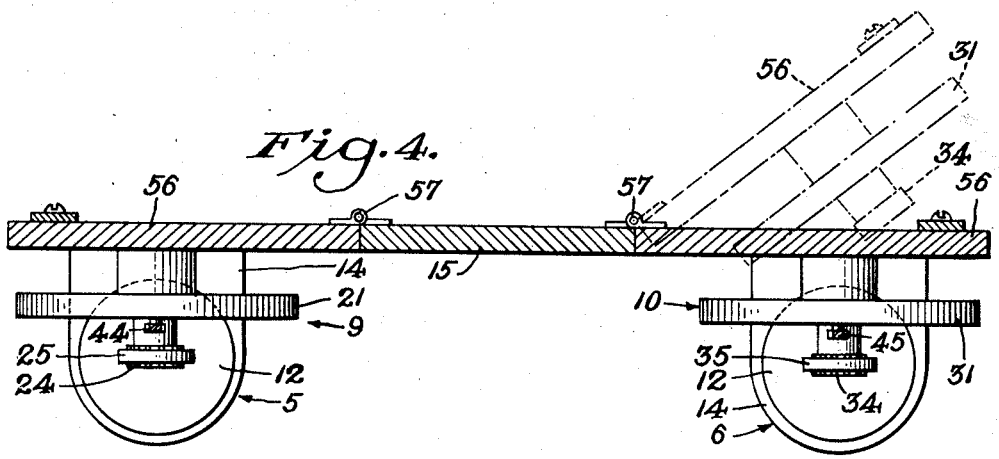
Inventor
John E. Watkins
BY
Carlson, Pitzner, Hubbard & Wolf
Attorneys.

Patented Oct. 5, 1948

2,450,772

UNITED STATES PATENT OFFICE 2,450,772

MEASURING APPARATUS RESPONSIVE TO VARIABLE CONDITIONS

John E. Watkins, Maywood, Ill.

Application February 14, 1945, Serial No. 577,862

5 Claims. (Cl. 73—407)

1

The invention relates to measuring apparatus generally and more particularly to apparatus adapted to respond to the variations of a pair of independently variable conditions and for facilitating the maintenance of a predetermined relationship between those conditions and a third variable condition.

One object of the invention is to provide improved apparatus of the above general character capable of conveniently and accurately effecting such measurements where the relationship between the variable conditions is a non-linear function.

Another object is to provide measuring apparatus of the above type which can be quickly and easily changed for the measurement of different relationships between the variable conditions.

A more specific object is to provide apparatus responsive to a pair of variable pressure conditions adapted to provide a visual indication of the value of a third pressure condition having a predetermined relationship thereto.

Other objects and advantages of the invention will become apparent from the following detailed description of the preferred embodiment illustrated in the accompanying drawings in which:

Figs. 2 and 3 are diagrammatic views showing the positions of the parts under different pressure conditions.

Fig. 4 is a sectional view taken in a horizontal plane substantially on the line 4—4 of Fig. 1.

Figure 1:
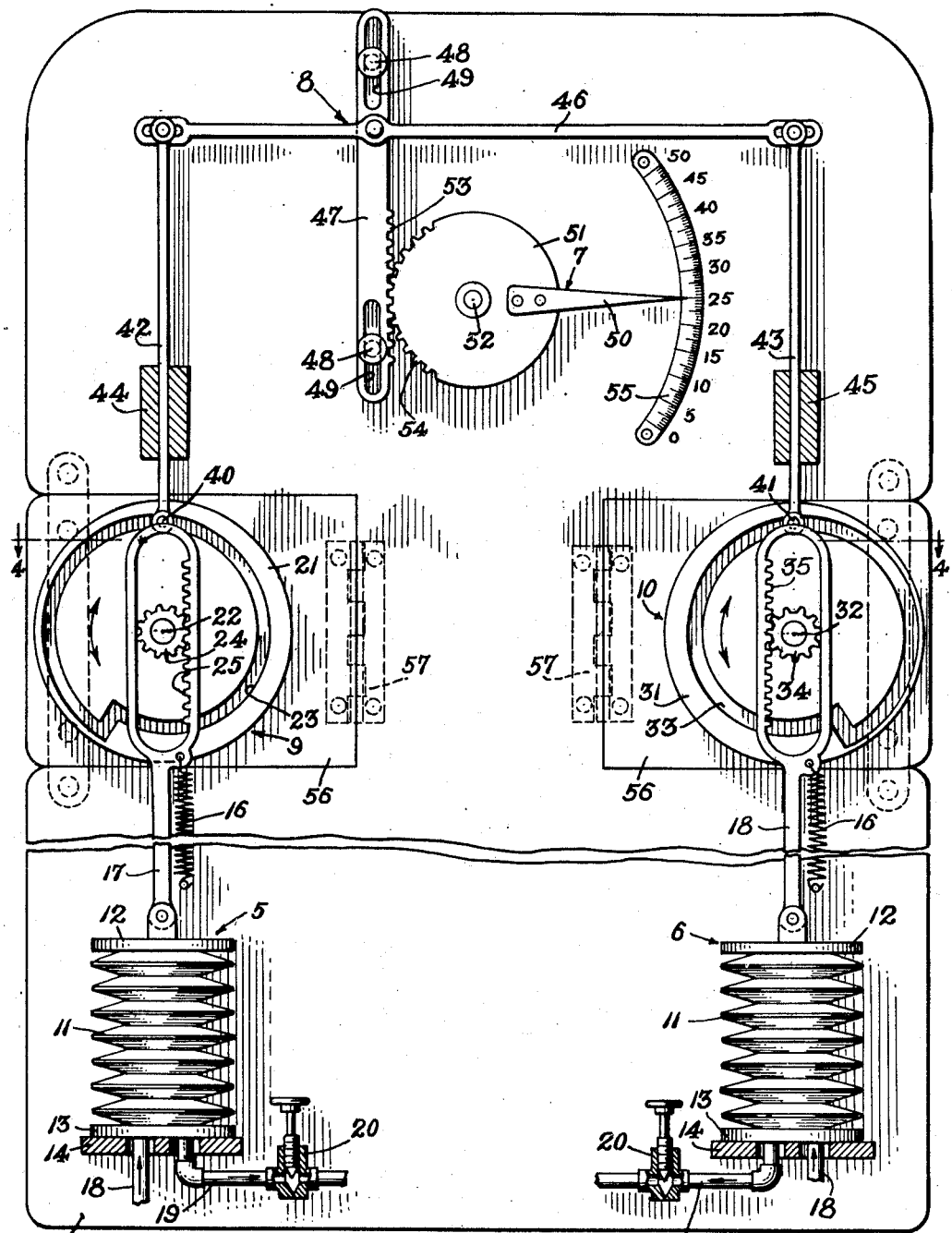
Figure 1 is a partly diagrammatic view of measuring apparatus embodying the features of the invention.

For purposes of illustration, the invention has been shown and will be described herein as embodied in a pressure responsive apparatus adapted to respond to the variations of two pressure conditions and visually indicate the value of a third pressure condition having a predetermined relationship with said two pressure conditions. It will be understood, of course, that the invention is not limited to providing such visual indication but is applicable as well for recording or control purposes. Moreover, while the invention has been shown embodied in pressure responsive apparatus, it will be appreciated that it may be utilized for the measurement of other variable conditions. It is to be understood, therefore, that I do not intend to limit the invention to the exemplary disclosure but aim to cover all modifications, alternative constructions and uses falling within the spirit and scope of the invention as expressed in the appended claims.

2

In carrying out the invention, I provide a pair of condition responsive devices 5 and 6 adapted to respond independently to two variable conditions, the response, in this instance, being directly proportioned to the variations of the conditions. The responsive movements of the devices 5 and 6 are integrated and transmitted to a common measuring member 7 by a linkage 8 including translating elements 9 and 10 individual to the respective devices. The translating elements 9 and 10, herein shown as cams, are constructed in a form correlated to a desired predetermined relationship between the two conditions being measured and a third variable condition and serve to modify the motions transmitted by the linkage so that movements of the measuring member 7 represent the value of the third variable condition necessary to maintain the desired relationship.

The exemplary apparatus selected to illustrate the invention is particularly adapted for use in the operation of two-stage compressors of the type commonly used in refrigerating systems. In such systems, a suitable liquefiable gaseous refrigerant is circulated by the compressor through a condenser and other apparatus, and in such case the pressure of the gas at the intake and discharge ports of the compressor may be either above or below atmospheric pressure. Efficient operation of such compressors requires the maintenance of an intermediate pressure between stages at a value having a predetermined relation to the intake and the discharge pressures. This relationship is expressed by the equation $P = C\sqrt{P_i \times P_d}$ where P is the intermediate pressure, $P_i$ the intake pressure of the first stage, $P_d$ the discharge pressure of the second stage, and C a constant whose value is dependent upon the extent to which the gas is cooled between stages.

Heretofore, in the operation of multi-stage compressors, it has been necessary for the attendant to calculate the required pressure ratios from a reading of two gauges showing the intake and discharge pressure. To simplify the calculation, the values for the different pressures are commonly laid out in columns on a chart so that the proper ratio for any given set of conditions may be determined by simply laying a ruler across two of the columns and reading the desired value in the third column. In practice, the attendant will rarely bother with even this simple procedure and consequently the most efficient operating ratio is seldom adhered to.

The present invention overcomes the above difficulty by providing at all times a direct indication of the optimum intermediate pressure condition for the prevailing intake and discharge pressures. All calculations are eliminated and the attendant is merely required to adjust the intermediate pressure to the value indicated by the measuring member 7. This may be done in various well known ways such as by varying the capacity of one or the other of the compressor stages.

For operation in the environment above described, the devices 5 and 6 are constructed to respond respectively to variations in intake and discharge pressures of the compressor. The devices are preferably similar in construction although they may vary in size as required by the particular pressure conditions to which they are subjected. As herein shown, each device comprises a generally cylindrical bellows element 11 closed at opposite ends by end plates 12 and 13. The latter end plate rests on and may be secured to a supporting bracket 14 carried by a wall or panel 15. As the end plate 13 is held in fixed position, the companion end plate moves with the bellows element in its expansion and contraction thus constituting an element movable linearly in accordance with variations in the pressure causing such expansion or contraction.

Yieldable means, such as spring 16, normally tend to collapse the bellows elements 11. The springs in this instance are connected between the panel 15 and motion transmitting members 17 and 18 anchored to the end plates 12 of the respective devices and constituting a part of the linkage 8. The bellows elements are expanded against the force of the springs 16 by the pressure of the gas admitted thereto by way of inlet ducts 18 opening through the stationary end plates 13. As herein shown, each bellows element is also provided with an outlet duct 19 equipped with suitable flow regulating means such as a needle valve 20 for adjusting the response of the device to pressure changes.

As the value intermediate pressure to be maintained between the two variable pressures under consideration, that is, the intake and discharge pressures of a two-stage compressor represents a non-linear function, the motions transmitted through the linkage to the measuring member 7 must be modified accordingly. Such modification is effected by the translating elements 9 and 10 interposed in the linkage 8 between the movable elements 12 of the condition responsive devices 5 and 6 and the measuring member 7.

The translating element 9, as herein shown, comprises a generally circular disk 21 supported for rotation about a central axis by a shaft 22 mounted on the panel 15. Formed in one face of the disk 21 is a generally spiral cam groove 23 correlated in shape with the functional relationship between the pressure conditions. Rotation of the cam disk 21 is effected by the condition responsive device 5 through the medium of a pinion 24 rigid with the disk and meshing with rack teeth 25 on the linkage member 17.

The translating element 10, as shown, is similar in construction to the element 9 above described comprising a generally circular disk 31 supported for rotation about a central axis by a shaft 32 mounted on the panel 15. The disk is formed with a spiral cam groove 33 opening in one face which, like the cam groove 23, is properly correlated with the functional relationship between the pressure conditions. A pinion 34 rigid with the disk meshes with rack teeth 35 on the linkage member 18 to provide a driving connection between the movable element 12 of the condition responsive device 6 and the disk 31.

Engaged in cam grooves 23 and 33 are a pair of cam followers in the form of pins 40 and 41 carried respectively on the lower ends of links 42 and 43 guided for vertical movement by guide sleeves 44 and 45 mounted on the panel 15. The other ends of the links 42 and 43 have pin and slot connections respectively with the opposite ends of a lever 46 supported intermediate its ends on a floating pivot. The floating support is provided, in this instance, by a bar 47 supported and guided for limited endwise movement by pins 48 fixed on the panel 15 and engaging in slots 49 in the bar.

Means is provided for transmitting the movements of the bar 47 to the measuring member 7 which preferably is in the form of an elongated tapering finger or pointer 50 fixed to and projecting radially from a disk-shaped member 51 rotatably supported on the panel 15 by a shaft 52. The motion transmitting connection, as herein shown, comprises rack teeth 53 formed on one edge of the bar 47 and meshing with teeth 54 formed in the adjacent edge of the disk 51.

The pointer 50 is positioned for cooperation with a graduated scale 55 fixed to the panel 15 and preferably arcuate about the pivotal axis of the disk 51 so that the pointer may swing thereover. In the particular apparatus illustrated, the scale is graduated to show the value of the optimum intermediate pressure for the pressure conditions prevailing, that is, the pressure required to establish the relationship between the several pressure conditions in accordance with the equation above set forth.

When changes occur in both the intake and discharge pressures such that the optimum intermediate pressure remains the same, the pressure responsive devices 5 and 6 rotate the cam disks 21 and 31 in step to impart proportionate movements in opposite directions to the cam followers 40 and 41. The floating lever 46 therefore simply rocks about its pivot without shifting the supporting member 47 thereby maintaining the pointer 50 stationary with respect to the scale 55.

Upon a change in either intake or discharge pressure which necessitates a change in the intermediate pressure, the lever supporting member 47 is shifted in one direction or the other and from the position shown in Fig. 1 to rock the pointer 50 either up or down the scale. Thus upon an increase in discharge pressure, the cam disk 31 associated with the pressure responsive device 6 is rocked in a clockwise direction, as for example, to the position shown in Fig. 2 and the pointer 50 is shifted upwardly along the scale 55. In the same way, a decrease in the discharge pressure causes the pressure responsive device 6 to rock the cam disk 31 in a counterclockwise direction thereby moving the pointer 50 downwardly along the scale as shown in Fig. 3. The attendant can therefore readily regulate the compressor for most efficient operation by simply noting the actual intermediate pressure on the gauge commonly provided for that purpose and then adjusting one or the other of the compressor stages until the intermediate pressure corresponds to the value indicated by the pointer 50.

To adapt the apparatus for operation where the relationship between the two variable conditions differs from the equation above discussed, cam disks 21 and 31 are replaced with similar disks having cam grooves correlated with the particular relationship to be measured. To facilitate such interchange, the cam disks 21 and 31 are preferably mounted on panel sections 56 (Figs. 1 and 4) connected by hinges 57 with the main body of the panel 15 so that they can be swung back to the position shown in broken lines in Fig. 4. When the panel sections 56 are thus swung back, the gears 24 and 34 are disengaged from the racks 25 and 35 and the cam disks 21 and 31 are disengaged from the followers 40 and 41. The disks may then be replaced without disturbing the linkage 8 or disconnecting any of the parts.

It will be apparent from the foregoing that the invention provides measuring apparatus of novel and advantageous construction operative to accurately measure the variation of two independently variable conditions and to indicate the value of a third condition having a predetermined relationship to the two variable conditions. The apparatus is particularly suitable for use where the relationship between the variable conditions is a non-linear function. Moreover, by simple and convenient changes, the apparatus may be readily adapted for the measurement of any desired relationship.

I claim as my inventions:

1. Apparatus for indicating a predetermined relationship between two independently variable pressure conditions comprising, in combination, a pair of pressure responsive devices adapted to respond independently to variations in the respective pressure conditions, each of said devices including an element movable in accordance with the variations in the pressure condition to which it is responsive, indicating means including an elongated pointer pivoted adjacent one end to sweep over a graduated scale, a linkage connecting said elements with said pointer including a shiftable member having a rack and pinion connection with the pointer, a lever pivoted intermediate its ends on said member, cams individually associated with and movable by said two elements, and followers cooperating with said cams and connected to opposite ends of said lever, said linkage being operative to move said pointer relative to said scale when said pressure conditions vary from a predetermined datum.

2. Apparatus for indicating the value of a pressure condition having a predetermined relationship to two independently variable pressure conditions comprising, in combination, a pair of pressure responsive devices adapted to respond independently to variations in the respective variable pressure conditions, each of said devices including an element movable in accordance with the variations in the pressure condition to which it is responsive, indicating means including an elongated pointer pivoted adjacent one end to sweep over a graduated scale, a linkage connecting said elements with said pointer including a shiftable member having a rack and pinion connection with the pointer, a lever pivoted intermediate its ends on said member, a cam follower connected with each end of said lever, a pair of rotatably supported cams positioned for coaction with said followers, and rack and pinion means connecting said elements with said cams whereby the cams are rotated in response to the movements of said elements, said cams being shaped so that said pointer is positioned relative to said scale in accordance with the value of the pressure condition having a predetermined relationship to said independently variable pressure conditions.

3. Apparatus for measuring the variations of two variable conditions from a predetermined relationship comprising, in combination, a pair of condition responsive devices adapted to respond independently to variations in the respective conditions, each of said devices including an element movable in accordance with the variation in the condition to which it is responsive, a pivotally supported measuring member, a linkage connecting said measuring member with said elements including a shiftable member having a driving connection with said measuring member, a lever pivoted intermediate its ends on said shiftable member, a cam follower connected with each end of said lever, cams connected with said elements for movement thereby and positioned for coaction with said followers, said cams being shaped to impart movement to said measuring member whenever said conditions vary from said predetermined relationship, a panel supporting said devices and said measuring member, and independent panel sections supporting said cams, said panel sections being hinged to the main body of said panel to swing relative thereto for disengaging said cams from said elements and said followers to facilitate removal and replacement of the cams.

4. Apparatus adapted to be responsive to two independently variable conditions and for indicating the value of a third variable condition having a predetermined nonlinear relation to said two conditions, said apparatus comprising, in combination, a pair of condition responsive devices adapted to respond independently to variations in the respective conditions, each of said devices including an element movable in accordance with the variation in the condition to which it is responsive, indicating means including an elongated pivotally supported pointer having one end positioned to sweep over a scale graduated to indicate the values of said third condition, a linkage connecting said movable elements with said pointer including a shiftable member having a rack and pinion connection with the other end of said pointer, a lever pivotally connected intermediate its ends to said member, cams individually associated with and movable by said elements, and followers cooperating with said cams and operatively associated respectively with opposite ends of said lever, said cams being shaped for operation through said linkage to set said pointer relative to said scale to indicate the value of said third condition as determined by the values of said two variable conditions.

5. Apparatus adapted to be responsive to two independently variable conditions and for indicating the value of a third variable condition having a predetermined nonlinear relation to said variable conditions, said apparatus comprising, in combination, a pair of condition responsive devices adapted to respond independently to variations in the respective conditions, each of said devices including an element movable in accordance with the variation in the condition to which it is responsive, indicating means including an elongated pivotally supported pointer having one end positioned to sweep over a scale graduated to indicate the values of said third condition, a linkage connecting said movable elements with said pointer including a linearly shiftable member having a connection with said pointer for rotating the same about its pivot, a lever pivotally connected intermediate its ends to said member, cams individually associated with and movable by said elements, and followers cooperating with said cams and operatively associated respectively with opposite ends of said lever, said cams being operative through said linkage to set said pointer relative to said scale for indicating the value of said third condition as determined by the values of said two variable conditions at any instant.

JOHN E. WATKINS.

REFERENCES CITED

The following references are of record in the file of this patent:

UNITED STATES PATENTS

| Number | Name | Date |
| --- | --- | --- |
| Re. 18,514 | Reeves | July 5, 1932 |
| 1,453,688 | Milker | May 1, 1923 |
| 1,783,880 | Kent et al. | Dec. 2, 1930 |
| 1,962,324 | Noble | June 12, 1934 |
| 2,222,551 | Ziebolz et al. | Nov. 19, 1940 |

FOREIGN PATENTS

| Number | Country | Date |
| --- | --- | --- |
| 315,751 | Great Britain | July 17, 1929 |